United States Patent [19]

Fink et al.

[11] 4,233,200
[45] Nov. 11, 1980

[54] METHOD OF SIZING TEXTILE YARNS AND SIZING AGENTS THEREFOR

[75] Inventors: Herbert Fink, Bickenbach; Egon Grumbach, Darmstadt; Horst Pennewiss, Darmstadt-Neu-Kranichstein, all of Fed. Rep. of Germany

[73] Assignee: Röhm GmbH, Darmstadt, Fed. Rep. of Germany

[21] Appl. No.: 14,765

[22] Filed: Feb. 23, 1979

[30] Foreign Application Priority Data

Apr. 17, 1978 [DE] Fed. Rep. of Germany ....... 2816515

[51] Int. Cl.$^3$ ................................................ C08K 5/02
[52] U.S. Cl. .............................. 260/33.8 UA; 8/115.6
[58] Field of Search ............... 260/33.8 UA; 8/115.6; 427/375, 395, 393; 428/385 R, 390 R

[56] References Cited

U.S. PATENT DOCUMENTS

| 3,728,299 | 4/1973 | Schramm | 260/33.8 UA |
| 3,878,147 | 4/1975 | Craven | 260/33.8 UA |
| 3,907,984 | 9/1975 | Calvert et al. | 260/33.8 UA |
| 3,987,002 | 10/1976 | Lakshmanan | 260/33.8 US |

FOREIGN PATENT DOCUMENTS 1133337  7/1962  Fed. Rep. of Germany .
2441277  4/1975  Fed. Rep. of Germany .

OTHER PUBLICATIONS

Chemical Abstracts; vol. 85, 95,738p, 1976.

*Primary Examiner*—Lewis T. Jacobs
*Attorney, Agent, or Firm*—Curtis, Morris & Safford

[57] ABSTRACT

What is disclosed is a method for sizing a textile yarn which comprises treating said yarn with a sizing solution comprising from 2.5 to 50 percent by weight of a polymer dissolved in an organic solvent, and then evaporating said solvent, said polymer being soluble in halohydrocarbons and being a saturated block copolymer comprised of at least two different unsaturated polymerizable hydrocarbons having two separated softening regions, one of which regions is below +20° C. and one of which regions is above +20° C., and wherein the blocks having the higher softening region form the disperse phase, i.e. above +20° C., as well as sizing solutions for use in said method, and the sized yarns so produced.

10 Claims, No Drawings

METHOD OF SIZING TEXTILE YARNS AND SIZING AGENTS THEREFOR

The present invention relates to a method of sizing textile yarns, to sizing agents therefor, which agents are soluble in halohydrocarbons, and to the sized yarns.

Sizing agents soluble in halohydrocarbons are of increasing interest because the de-sizing of yarns sized with conventional water-soluble dressing agents has been made more difficult by more stringent restrictions on water pollution. In many cases it has been proved more economical to de-size the yarn using halogenated hydrocabons and to recover the washing liquid by distillation than to separate the sizing or dressing agent from an aqueous de-sizing bath. The advantages of sizing and de-sizing fron non-aqueous solvents are described by D. J. Lloyd in "Chemiefasern/Textilindustrie", page 148 (February 1978) and F. J. Gierse in "Melliand Textilberichte", page 538 (1976). In their opinions, a future conversion to completely water-insoluble sizing agents is a real possibility.

Organic sizing agent solutions containing chlorinated rubber, polychlorobutadiene, polyisobutylene, polyacrylic acid esters, chlorosulfonated polyethylene, polyvinyl ether, polyvinyl acetate, or copolymers of vinyl chloride and vinyl esters are known in the prior art. None of these polymers has come into practical use as dressing agents because they are either too soft and sticky or, if they are made harder, they adhere poorly to the fibers and spall off.

Copolymers comprising 20 to 80 percent of methyl methacrylate, styrene, or acrylonitrile and 80 to 20 percent of acrylic estes or higher methacrylic esters are also proposed in the prior art as sizing agents soluble in halohydrocarbons. Similar copolymers having an additional content of monomer units having carboxyl groups are mentioned elsewhere in the art. Further, the art describes copolymers of vinyl chloride, vinylidene chloride, vinyl acetate, and, optionally, acrylic acid as sizing agents. However, these polymers still give no satisfactory fibril binding. The problem of fibril bonding with an improved sizing agent still remains.

It has been found that polymers, soluble in halohydrocarbons, of unsaturated polymerizable hydrocarbons will, when dissolved in an organic solvent, give sizing films on textile yarns having the desired properties if such solutions contain a polymer which is a saturated copolymer, having a block structure, of at least two different unsaturated polymerizable hydrocarbons having two separated softening regions, of which latter one region is below 20° C. and one is above 20° C., and wherein those blocks of the block copolymer which have the higher softening region constitute a disperse phase. (These characteristics are referred to the solid polymer, free of solvent).

The differentiated softening regions of the polymers which are contained in the new sizing agent according to the invention are ultimately the result of a two-phase system. The polymer, in a torsion swing test (for example according to DIN 53445), shows two damping maxima which include a thermoelastic region. At 20° C. one of the phases is in the softened condition and the other is in a glassy or crystalline condition. Preferably, the lower softening region, i.e. the glass temperature, is below 0° C. and the upper softening temperature, that is the transformation from the thermoelastic region to the thermoplastic condition, is at a temperature above 60° C. The hard phase is dispersed in the soft phase. Because of the block structure, the disperse particles of the hard phase act as cross-linking points in the soft phase and impart rubber-elastic properties thereto.

Block copolymers as a rule form two-phased systems of this type. The existence of two phases is attributable to the incompatibility of the different polymer blocks or segments. Whereas mixtures of homopolymers of hydrocarbons, which in the majority of cases are incompatible, can de-mix until separate layers are formed, in block copolymers the phase separation remains limited to disperse regions within the soft phase. In many cases the phase separation is incomplete, e.g. in case of partial crystallization of blocks incompatible with the soft phase.

The physical cross-linking due to phase separation is of a reversible nature. The block copolymers are therefore soluble in halohydrocarbons and can be melted when the second softening region is exceeded. Their suitability as sizing films depends, essentially, on the presence of the aforementioned thermoelastic region. On the one hand, the polymers are soft and elastic at room temperature since they are present above the glass condition; on the other hand, they are characterized by only slight tackiness.

Block copolymers can be obtained according to a variety of known methods of which several examples are given in Houben-Weyl, "Methoden der organischen Chemie", Volume 14/1, pages 110–115. The preparation of the polymers is not the subject of the present invention. Within the block copolymers, the different blocks can alternate within a linear molecule or the blocks of one of the polymer components can be bound as side chains to a chain of the other polymer component in a fashion resembling a comb. The latter case is also described as involving graft copolymerization. The unsaturated polymerizable hydrocarbons which are employed in the construction of these polymers are so chosen that the respective homopolymers are incompatible and have differing softening temperatures. These do not always exactly agree with the softening temperatures of the block copolymers. At least one of the unsaturated hydrocarbons should give a homopolymer having a softening temperature which is below 20° C. (determined according to DIN 53445).

Among the unsaturated hydrocarbons from which the block copolymers can be formed are the alpha-olefins such as ethylene, propylene, butylene, isobutylene, and the higher alpha-olefins having 5 to 12 carbon atoms; dienes, particularly butadiene and isoprene; and aromatic vinyl compounds such as styrene. As a rule, no more than two unsaturated hydrocarbons are present in the copolymer. Each of the hydrocarbons taking part is preferably present in an amount of at least 10 percent by weight of the copolymer. If the copolymer comprises more than two unsaturated hydrocarbons, it is sufficient that at least two of the corresponding homopolymers are incompatible with each other. The mixing ratio is in each case so chosen that the blocks with the higher softening temperature form the disperse phase. The block copolymers can be prepared in known fashion, in some cases by free-radical polymerization, in some cases by anionic polymerization, and in some cases by Ziegler-Natta polymerization. Suitable commercial materials prepared according to the present invention are not only the finished solutions, ready for use, but, above all, the finely divided solid polymers or their concentrated solutions, for example solutions containing 50 percent by weight of solids.

As exemplary of the polymers which are contained in sizing agents according to the invention, block copolymers comprising 65 to 90 percent by weight of ethylene and 35 to 10 percent by weight of propylene can be mentioned, which polymers are prepared by Ziegler-Natta polymerization. They contain polyethylene blocks which permit the local formation of crystalline regions, but are predominantly amorphous. The two softening temperatures are at −34° C. and at +49° C. Similar properties are exhibited by saturated block copolymers comprising 40 to 60 percent by weight of styrene and 60 to 40 percent by weight of butadiene or isoprene. These are prepared by anionic polymerization of the named monomers. The unsaturated groups contained therein, which would make the polymers sensitive to oxygen when in the forn of thin films, are hydrogenated. In this fashion, saturated polymers are formed which are extensively free of double bonds. (The aromatic groups of the styrene units are not to be considered as "unsaturated" according to the sense of the present invention.) In these copolymers, the blocks comprised of styrene units unite to form glassy solidified regions. The thermoelastic region of these polymers extends from −52° C. to +109° C.

For the preparation of the sizing bath, the copolymers are dissolved at a concentration of about 2.5 to 15 percent by weight in a solvent, preferably perchloroethylene. The viscosity of the solution at the temperature of use should, for technical reasons, not exceed 1000 mPa.s and preferably is from 20 to 800 mPa.s. Viscosities in this region are attained if polymers having a molecular weight between 10,000 and 200,000 are employed. The preferred molecular weight is from 80,000 to 120,000, in each case measured as the weight average molecular weight.

The novel sizing agents are suitable for sizing endless yarns and staple fiber yarns of natural and synthetic fibers, such as cotton, wool, silk, rayon, cuprammonium rayon, cellulose, acetate, polyester, polyamide, polyacrylic, or polypropylene fibers, as well as mixed fiber yarns. Preferably, yarns of the kind mentioned in the following Table are sized with the agents according to the invention.

The agents are preferably applied to the yarn in an amount of from 0.2 to 25 percent by weight of the unsized yarn, suitably by passing the yarn through the sizing bath, squeezing, and subsequently drying, e.g. by means of hot air or heated cylinders, at drying temperatures between 30° C. and 200° C. In addition to the aforementioned warp sizing, the sizing of individual yarns or bobbin sizing is also contemplated.

The sized warp does not become tacky even at high humidity or at relatively high storage temperatures. The fibril bonding meets the demands made by modern textile machines.

The superiority of the sizing agents according to the present invention in comparison with those known in the prior art, but which have no thermoelastic region, is evident from the following Table.

The polymers designated in the Table as A and B are sizing agents according to the present invention.

A is a block copolymer comprising 72 percent by weight of ethylene and 28 percent by weight of propylene. (Molecular weight=100,000; glass temperature=−34° C.; upper softening temperature=+49° C.)

B is a hydrogenated (saturated) block copolymer of 45 percent by weight of styrene and 55 percent by weight of butadiene. (Molecular weight=100,000; glass temperature=+52° C.; upper softening temperature=+109° C.).

For comparison, a statistical copolymer (C) according to German Offenlegungesschrift (DE-OS) No. 2,441,277 (Example 10) comprising 80 percent by weight of butyl methacrylate and 20 percent by weight of methyl methacrylate is employed. (Molecular weight=200,000; glass temperature=41° C.; elasticity modulus=900 N/mm².

Different yarns were sized with 5 percent solutions of sizing agents A, B, and C, squeezed off, and dried at 110° C. The sizing effect was evaluated from the effects on the sized threads of a standardized rubbing stress.

The standardized rubbing stress was produced by means of a rubbing cam, made from rounded roughened glass, which rotated on a horizontal axis at 30 rpm, with a radial offset of 147 mm. On each rotation, the cam displaced sideways at 45 cm long, vertically-suspended, thread to which a 50 g load was attached. The thread was displaced in about the middle thereof by a distance of about 20 mm.

For an endless fiber yarn, the number of rubbing strokes (rotations) is given at which yarn bonding (fibril bonding) breaks. For cotton yarns, the fuzziness and roughness after 20 rubbing strokes (revolutions) is qualitatively judged.

| | Sizing Effect | | |
| | Agents of the Invention | | Comparison |
| Yarn | A | B | Test |
| --- | --- | --- | --- |
| Rayon dtex 133 f 24 | 110 | 1300 | 25 |
| Acetate dtex 110 f 28 | 55 | 350 | 30 |
| Polyester, smooth non-twisted, dtex 78 f 26 | 15 | 20 | 10 |
| Polyamide, smooth, non-twisted, dtex 78 f 18 | 20 | 80 | 5 |
| Cotton, dtex 145 f 1 | Very good | Good | Average |

For both sizing and de-sizing, perchloroethylene is principally used. G. Reinert has described the advantages of this solvent, over all other solvents in the textile industry, in "Textilveredelung", 11, 109 et seq. (1976). The solubility of a polymer in this solvent is thus of particular significance. Also, other halohydrocarbons can be considered as solvents, particularly those having one or two carbon atoms, e.g., 1,1,1-trichloroethane trichlorofluoromethane, and 1,1,2-trichloro-1,2,2-trifluoroethane as well as—although with lesser significance—trichloroethylene, carbon tetrachloride, and chloroform. However, it is not necessary that the polymer be soluble in each of these halohydrocarbons. To the extent that the polymer is also soluble in other organic solvents in addition to halohydrocarbons, such as gasoline hydrocarbons, aromatics, or esters, these also can be used for sizing or de-sizing, although they are less suitable because of their flammability. The use of solvents or solvent additives in which the molecular blocks of the disperse phase have a smaller degree of solubility than does the amorphous soft phase promotes the formation of separate phases and improves the property of the sizing film.

The sizing bath can subsequently be filtered or cleaned in some other way and distilled. The residual sizing agent can optionally be used again for sizing.

What is claimed is:

1. A method for sizing a textile yarn which comprises treating said yarn with a sizing solution comprising from 2.5 to 15 percent by weight of a polymer dissolved in an organic solvent, and then evaporating said solvent, said polymer being soluble in halohydrocarbons and being a saturated block copolymer comprised of at least two different unsaturated polymerizable hydrocarbons having two separated softening regions, one of which regions is below +20° C. and one of which regions is above +20° C., and wherein the blocks having the higher softening region form the disperse phase.

2. A method as in claim 1 wherein said organic solvent is a halohydrocarbon.

3. A method as in claim 2 wherein said halohydrocarbon has one or two carbon atoms.

4. A method as in claim 3 wherein said halohydrocarbon is perchloroethylene.

5. A method as in claim 1 wherein said copolymer is a saturated block copolymer of at least two unsaturated hydrocarbons selected from the group consisting of alphaolefins, dienes, and vinyl aromatic compounds.

6. A method as in claim 1 wherein said polymer has a molecular weight between 10,000 and 200,000.

7. A method as in claim 1 wherein said copolymer comprises from 65 to 90 percent by weight of ethylene and from 35 to 10 percent by weight of propylene.

8. A method as in claim 1 wherein said copolymer comprises from 40 to 60 percent by weight of styrene and from 60 to 40 percent by weight of butadiene or isoprene.

9. A method as in claim 1 wherein and textile yarn is a yarn comprising cotton, fibers of regenerated cellulose, cellulose acetate, polyester, or polyamide.

10. A yarn sized according to the method of claim 1.

* * * * *